(12) United States Patent
Mak et al.

(10) Patent No.: US 7,597,746 B2
(45) Date of Patent: Oct. 6, 2009

(54) CONFIGURATIONS AND METHODS FOR ACID GAS AND CONTAMINANT REMOVAL WITH NEAR ZERO EMISSION

(75) Inventors: John Mak, Santa Ana, CA (US); Curt Graham, Mission Viejo, CA (US)

(73) Assignee: Fluor Technologies Corporation, Aliso Viejo, CA (US)

( * ) Notice: Subject to any disclaimer, the term of this patent is extended or adjusted under 35 U.S.C. 154(b) by 641 days.

(21) Appl. No.: 10/532,262

(22) PCT Filed: Feb. 12, 2003

(86) PCT No.: PCT/US03/04376

§ 371 (c)(1),
(2), (4) Date: Sep. 27, 2005

(87) PCT Pub. No.: WO2004/058384

PCT Pub. Date: Jul. 15, 2004

(65) Prior Publication Data

US 2006/0150812 A1    Jul. 13, 2006

Related U.S. Application Data

(60) Provisional application No. 60/434,358, filed on Dec. 17, 2002.

(51) Int. Cl.
*B01D 53/14* (2006.01)

(52) U.S. Cl. ............... 95/169; 95/181; 95/183; 95/199; 95/229; 95/235; 95/236; 95/237; 96/234; 96/243

(58) Field of Classification Search .......... 95/199, 95/114, 136, 139, 143–148, 235–237, 181, 95/183, 159, 169, 228, 229; 96/121, 131–132, 96/234, 243; 423/228–229, 220
See application file for complete search history.

(56) References Cited

U.S. PATENT DOCUMENTS

| 4,138,230 A | * | 2/1979 | Thompson ............ 95/169 |
| 4,305,733 A | * | 12/1981 | Scholz et al. ......... 48/127.3 |
| 4,425,317 A | * | 1/1984 | Zeller et al. .......... 423/574.1 |

* cited by examiner

*Primary Examiner*—Duane Smith
*Assistant Examiner*—Ives Wu

(57) ABSTRACT

A gas (1) comprising hydrogen sulfide, carbon dioxide, and hydrocarbon contaminants is treated in a plant (FIG. 2) in a configuration in which waste streams are recycled to extinction. In especially preferred aspects of contemplated methods and configurations, hydrogen sulfide and other sulfurous components are converted to a sulfur product (37), carbon dioxide (44A) is separated at a purity sufficient for enhanced oil recovery or sale, and hydrocarbon contaminants are purified to a marketable hydrocarbon product (49).

19 Claims, 2 Drawing Sheets

FIGURE 1 – PRIOR ART

CONFIGURATIONS AND METHODS FOR ACID GAS AND CONTAMINANT REMOVAL WITH NEAR ZERO EMISSION

This application claims the benefit of U.S. provisional patent application with the Ser. No. 60/434,358, which was filed Dec. 17, 2002 and which is incorporated by reference herein.

FIELD OF THE INVENTION

The field of the invention is gas processing and treating, and especially gas processing and treating with near zero emissions.

BACKGROUND OF THE INVENTION

Natural gas streams that contain low levels of acid gases and other contaminants can be economically treated by a wide variety of known treating processes. However, with increasing acid gas and other contaminant content, current treating processes often require relatively large quantities of energy and may further require additional processing equipment.

An exemplary known gas treatment configuration that employs the use of a physical solvent is depicted in prior art FIG. 1 in which an absorber 203, a flash drum 205, a recycle compressor 206, exchanger 207, a solvent regenerator 208, a reboiler 209, a solvent pump 216, and a refrigerant chiller 217 are configured to remove hydrogen sulfide and contaminants from a feed gas (Further components of this plant include sulfur plant 213, hydrogenation and quench unit 214 and tail gas unit 215). It should be recognized that such plants are typically not selective in the removal of $H_2S$ and contaminants (i.e., co-absorption of $CO_2$ by the solvent is relatively high). Particularly, when the feed gas 1 comprises relatively large $CO_2$ quantities (e.g., greater than 50%), co-absorption of $CO_2$ in such plants requires higher solvent circulation and higher energy consumption and also produces an acid gas rich in $CO_2$ (typically 80%) that is an undesirable acid gas for the sulfur plants. As a result, and especially where the feed gas comprises relatively high concentrations of acid gas and other contaminants, the capital and operating costs required by these processes are generally very high. Very often, post treatment of the treated gas from these units with additional processing equipment is required, due to the fact that elimination of contaminants is frequently below desirable levels.

To circumvent at least some of the problems associated with inadequate contaminant removal, various post treatment methods of treated gases have been employed. Unfortunately, most of such methods tend to be relatively inefficient and costly, and where contaminants are removed by a fixed bed absorbent process, they may further pose a disposal problem for the spent absorbent. Therefore, various problems associated with operating efficiency, effluents; emissions, and product qualities, particularly in the downstream sulfur recovery unit and tail gas unit, still remain. For example, acid gas produced from such treating processes is generally poor in quality (e.g., comprising significant quantity of contaminants, and/or a relatively large quantity of co-absorbed $CO_2$ and hydrocarbons), which often requires additional processing and higher energy consumption, thereby increasing the overall capital and operating costs of the sulfur plant. Furthermore, co-absorbed hydrocarbons in the acid gas must generally be converted to $CO_2$ in the sulfur plant, which results in an increase in $CO_2$ emissions from the process. Thus, despite the significant potential energy value in the hydrocarbons, most of the currently known processes fail to recover these waste hydrocarbon streams as a valuable product.

In other known processes, a tail gas unit is often used to control the sulfur emissions from the sulfur plant. Even if the emission is reduced to a very low ppm level, the total quantity of annual sulfur emissions (tons/year) in the vent stream is still relatively high, due to relatively large venting rates attributed to the large co-absorbed $CO_2$ in the treating process. Moreover, contaminants and hydrocarbons in the acid gas of most known gas treatment configurations are often not completely destroyed in the sulfur plants, and the sulfur product will therefore be contaminated with unconverted hydrocarbons and mercaptans and will thus become an additional industrial waste disposal problem.

Therefore, while various gas processing treatments and configurations are known in the art, all or almost all of them suffer from one or more disadvantages, and especially where the feed gas comprises relatively high levels of acid gases, hydrocarbons and other contaminants.

SUMMARY OF THE INVENTION

Figure 1:
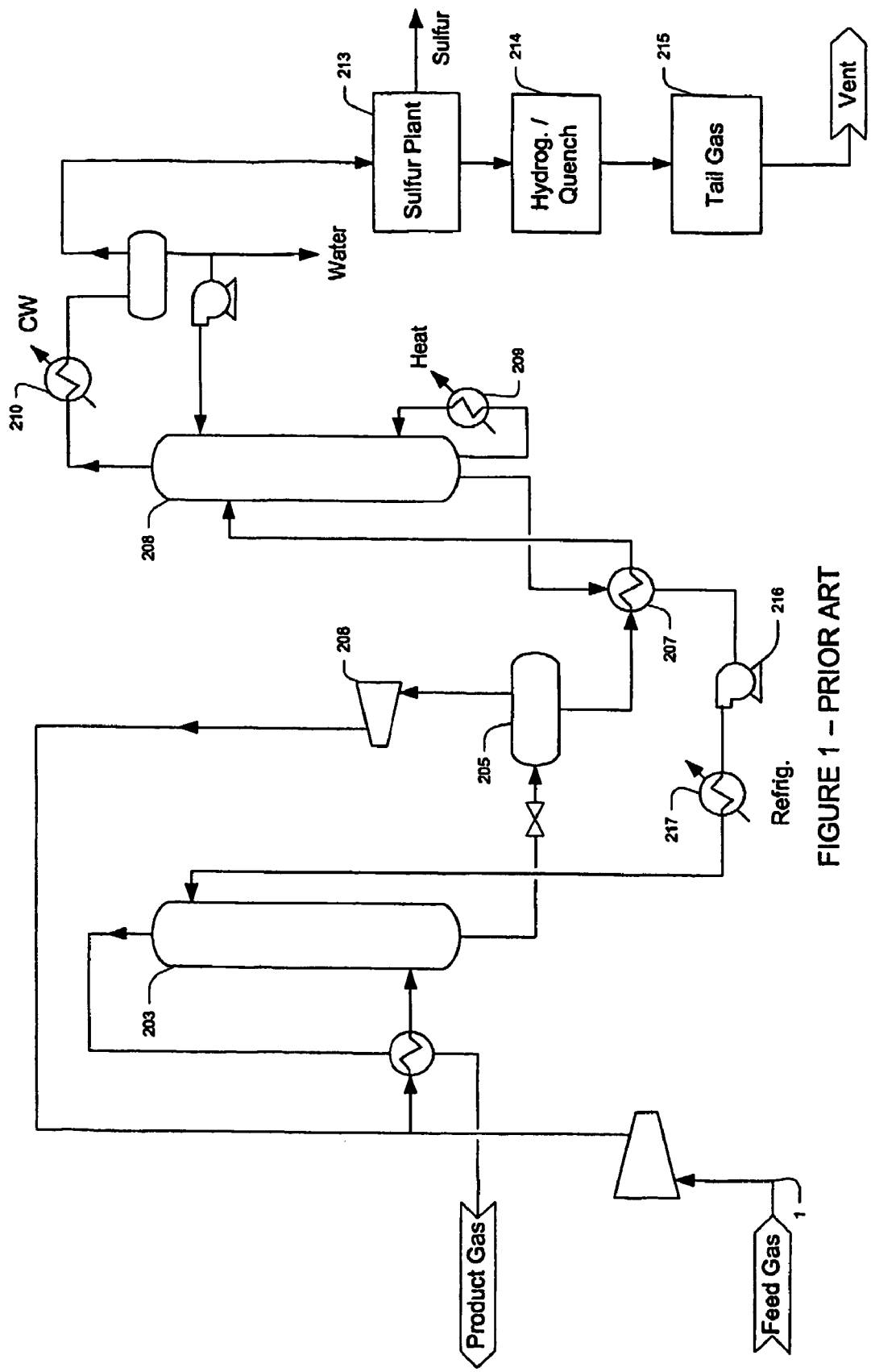
FIG. 1 is an exemplary prior art schematic of a gas treatment plant.

The present invention is directed to plant configurations and methods for treatment of a gas comprising relatively high levels of acid gases, hydrocarbons and other contaminants, wherein contemplated configurations and methods significantly reduce, if not even almost eliminate emissions of sulfurous components, heavy hydrocarbons, and/or other contaminants while providing a sulfur and contaminant-depleted dehydrated gas with a low hydrocarbon dew point suitable for pipeline sales.

In one aspect of the inventive subject matter, a gas treatment plant has a first absorber in which a lean solvent absorbs carbon dioxide, hydrogen sulfide, and heavy hydrocarbons. A second absorber is fluidly coupled to the first absorber, wherein at least part of the hydrogen sulfide is separated from the carbon dioxide, and a sulfur plant receives the hydrogen sulfide to produce a sulfur product and a tail gas, wherein at least part of the tail gas is hydrogenated and is recycled to the absorber.

Particularly contemplated plant configurations further include a regenerator coupled to the first and second absorbers, wherein the regenerator produces an acid gas, and wherein at least part of the hydrocarbon is separated from the acid gas as a hydrocarbon liquid. Where the hydrocarbon liquid is sold as a valuable product, a stripper may be included that receives at least part of the hydrocarbon liquid and in which residual sulfurous compounds are at least partially stripped from the hydrocarbon liquid, with the stripped vapor optionally fed to a sulfur plant. With respect to the carbon dioxide in the acid gas, it is generally preferred that the second absorber is operated at a lower pressure and at a higher temperature than the first absorber such that carbon dioxide is desorbed from the rich solvent and is recycled back to the first absorber. The so obtained carbon dioxide may then be optionally used for enhanced oil recovery or used as commercial product.

In one aspect of the inventive subject matter, a gas treatment plant has an absorber that receives (a) a feed gas comprising carbon dioxide and hydrogen sulfide, (b) a carbon dioxide saturated lean solvent, and (c) that produces an overhead vapor comprising at least a portion of the carbon dioxide, wherein a lean solvent is combined with the overhead vapor and then cooled, to form a cooled carbon dioxide saturated lean solvent, thereby reducing the temperature rise in the absorber and hence increasing selective absorption of the hydrogen sulfide from the feed gas in producing a treated gas with 4 ppm or less total sulfide content.

The absorber produces in especially preferred configurations a bottom product that is further reduced in pressure and heated to a higher temperature sufficient to desorb the carbon dioxide content from the bottom product, and the $H_2S$ content in the so separated carbon dioxide is re-absorbed in a second absorber using a portion of the carbon dioxide saturated lean solvent.

In yet another aspect of the inventive subject matter, a gas treatment plant has a solvent regenerator that receives from a plurality of absorbers a rich solvent comprising an acid gas and a heavy hydrocarbon, and that produces an overhead vapor that is further cooled and separated, thereby forming an acid gas, water and liquid hydrocarbon. The hydrocarbon liquid is optionally fed to a stripper that fractionates the hydrocarbon liquid to produce a hydrogen sulfide depleted hydrocarbon product and a vapor comprising hydrogen sulfide that is fed to a sulfur plant.

In a particularly preferred aspect of such configurations, the acid gas, containing residual quantities of contaminants (heavy hydrocarbons and mercaptans), is fed to an absorber in which a carbon dioxide depleted hydrogen sulfide rich solvent is used to further scrub the acid gas and to produce a concentrated $H_2S$ stream depleted of heavy hydrocarbons, which is preferably fed to the sulfur plant. It is still further contemplated that the sulfur plant produces a marketable sulfur product and a tail gas, wherein at least part of the tail gas is hydrogenated and is recycled to at least one of the plurality of the absorbers.

In a further aspect of the inventive subject matter, a gas treatment plant has an absorber that receives from a solvent regenerator a vapor comprising hydrogen sulfide and a hydrocarbon, and that further receives a carbon dioxide-depleted solvent comprising hydrogen sulfide, wherein the absorber produces a hydrocarbon-depleted overhead vapor comprising hydrogen sulfide that is fed to a sulfur plant, and a hydrocarbon-enriched bottom product that is recycled to the solvent regenerator. It is generally preferred in such configurations that the carbon dioxide-depleted solvent is produced by another absorber that separates hydrogen sulfide from carbon dioxide using a carbon dioxide saturated lean solvent, and that a portion of the carbon dioxide-depleted solvent is fed to the solvent regenerator.

Consequently, the inventors contemplate a method of treating a gas in which in one step the gas is optionally contacted with a first portion of a lean solvent to absorb at least one of a heavy hydrocarbon and a heavy mercaptans (ethyl mercaptans and heavier mercaptans) from the gas into the first portion of the lean solvent. In another step, the gas is cooled and the cooled gas is contacted in an absorber with a second portion of the lean solvent to absorb at least one of a light hydrocarbon, a light mercaptans (methyl mercaptans), and $H_2S$ into the second portion of the lean solvent, wherein the second portion of the lean solvent is saturated with carbon dioxide. In yet another step, the gas exiting the absorber is further contacted with a third portion of the lean solvent to saturate the third portion with carbon dioxide thereby forming a gas solvent mix, and the gas solvent mix is then cooled and separated thereby forming the second portion of the lean solvent that is saturated with carbon dioxide.

Various objects, features, aspects and advantages of the present invention will become more apparent from the following detailed description of preferred embodiments of the invention.

DETAILED DESCRIPTION

The inventors discovered that gas comprising relatively high levels of acid gases and other contaminants can be treated in a process that significantly reduces, if not even almost eliminates emissions of sulfurous components, hydrocarbons, and/or other contaminants. Contemplated process will typically produce a dehydrated gas with a low hydrocarbon dewpoint that will meet pipeline sales gas specifications.

Furthermore, contemplated configurations will produce a hydrogen sulfide rich and hydrocarbon depleted gas that can be efficiently processed in a sulfur plant, and the tail gas of the sulfur plant is (after hydrogenation and quenching) recycled back to the feed gas. Still further, the hydrocarbons separated and recovered from the feed gas in contemplated configurations are generally suitable for use as a liquid fuel after further processing. Thus, it should be especially appreciated that contemplated configurations and methods allow for feed gas processing of a contaminated feed gas in which all undesirable components (especially including heavy and light hydrocarbons, mercaptans, hydrogen sulfide, and carbon dioxide) are recycled to extinction, or removed and recovered as commercially valuable products.

In particularly preferred configurations and methods, a four-step absorption process is employed in which a lean solvent (most preferably a solvent comprising dialkyl ethers of polyethylene glycols and water) selectively absorbs sulfurous components, hydrocarbons, and/or other contaminants. Additionally or optionally, a cooling/absorption process may be included to trap undesirable hydrocarbons and contaminants (e.g., mercaptans or disulfides) in a hydrocarbon liquid that is then processed in another step to produce valuable products.

Figure 2:
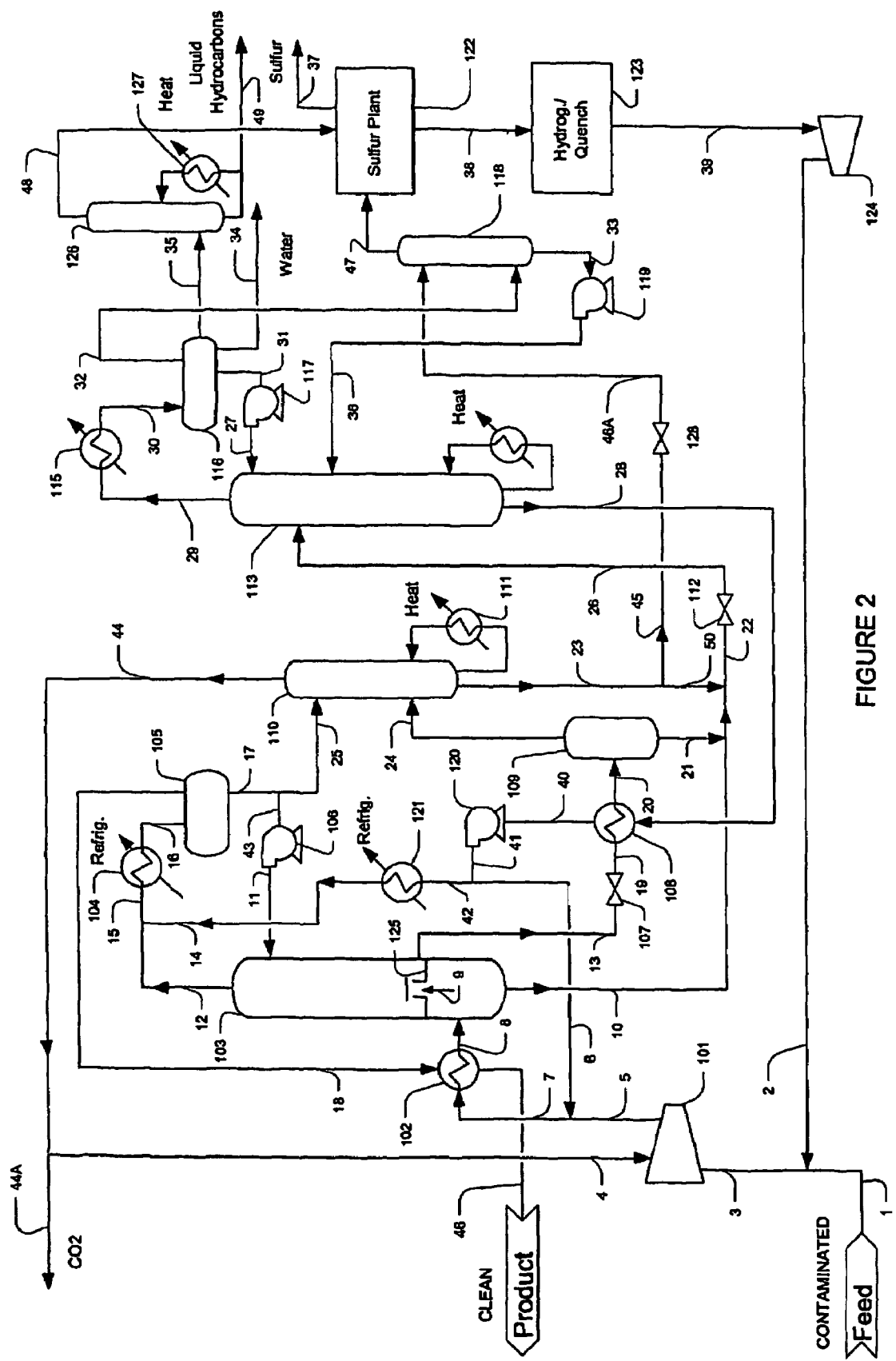
FIG. 2 is an exemplary schematic of a gas treatment plant according to the inventive subject matter.

An exemplary configuration is depicted in FIG. 2. Here, feed gas stream 1, at ambient temperature and atmospheric pressure, is combined with the hydrogenation/quench gas stream 2 to form stream 3 that is compressed in feed compressor 101. Recycle stream 4 from the reboiled absorber 110 is fed to the interstage of compressor 101 and the total gas stream is compressed to a suitable pressure forming stream 5, typically at 200 to 400 psig, or as needed for the pipeline requirement.

It should generally be appreciated that the feed gas composition may vary considerably, and that suitable feed gases include natural gas at various pressures, synthesis gas, landfill waste gases, and various refinery off-gases. However, in especially preferred aspects, the feed gas is a low pressure, low quality natural gas with a composition of about 30 to 70% $CO_2$, 20 to 50% $C_1$; 2 to 5% $H_2S$, 0.5 to 10% $H_2$, 3 to 5% $C_2$-$C_5$, 0.5 to 2% $C_6$-$C_7$, 0.1 to 0.5% $C_8$-$C_{9+}$, 0.2 to 1% mercaptans, disulfides, COS and HCN contaminants, with the balance being inerts (e.g., $N_2$). Moreover, it should be recognized that suitable feed gases may comprise water, and may even be saturated with water.

In an exemplary operation, the low quality feed gas stream has a feed rate of 100 MMscfd and is supplied at close to atmospheric pressure and ambient temperature, and is saturated with water. In the exemplary configuration of FIG. 2, the four absorption steps are performed with lean solvent streams using lean solvent stream 6, 14, 25, and 45 respectively. With respect to the solvent employed in contemplated absorbers (absorber 103, 110 and 118), it should be recognized that numerous physical solvents and mixtures thereof are appropriate. There are numerous physical solvents known in the art, and exemplary solvents include propylene carbonate, tributyl phosphate, normal methylpyrrolidone, and other various polyethylene glycol dialkyl ethers. Alternatively, suitable solvents may also include an enhanced tertiary amine or other solvent having similar behavior as a physical solvent. However, it is generally preferred that the solvent comprises a mixture of dimethyl ethers of polyethylene glycols and water. Furthermore, it should be appreciated that water at suitable concentrations in dimethyl ethers of polyethylene glycols will promote stripping and desorption of contaminants from the solvent.

In a first absorption step, a specified and relatively small quantity of the lean solven is injected to the feed gas to trap heavy components, including $C_{9+}$ hydrocarbons and heavy mercaptans before the feed gas is further cooled and enters the absorber. Removal of the heavy contaminants from this first absorption prevents significant quantities of heavy hydrocarbons and contaminants from entering the second absorption step, thereby avoiding downstream heavy hydrocarbon condensation in the absorber. Furthermore, excessive heavy hydrocarbons in the absorber tends to cause foaming, which is also undesirable. The quantity of lean solvent required in this first absorption step is relative small, and will generally depend on the amount of heavy hydrocarbons in the feed. However, in most configurations, the quantity of lean solvent will be less than 10% of the total circulating solvent, and more typically about 2% to 5% of total solvent circulation. Furthermore, it should be recognized that the quantity of lean solvent can be adjusted as needed to remove the heavy hydrocarbons.

In the exemplary configuration of FIG. 2, lean solvent stream 6, at about 20 gpm, is mixed with compressed feed gas stream 5 forming stream 7 that is cooled in exchanger 102 with treated gas stream 18 (the product gas), to cooled stream 8 at typically 60° F. to 90° F. It should be especially noted that the absorption efficiency is significantly enhanced with the chilling process in exchanger 102 resulting in substantially complete removal of heavy components (e.g., $C_{9+}$ hydrocarbons), heavy mercaptans, and disulfides, as well as the majority (i.e., at least 75%, and more typically at least 90%) of water content. Exchanger 102 preferably uses the refrigeration content in the treated gas stream 18, thus requiring no external cooling and producing warmed product gas 46. However, it should be recognized that optional and/or additional external refrigeration may also be included (e.g., where the feed gas contains relatively large amounts of heavy components).

It is generally preferred that the absorber 103 comprises two sections, wherein the lower section is employed for separating the heavy contaminants from the feed gas absorbed in the first step, while the upper section is employed for the second absorption step to remove lighter contaminants (e.g., hydrogen sulfide, light mercaptans, light hydrocarbons). In such configurations, the heavy contaminants (e.g., hydrocarbons, mercaptans, disulfides, etc.) are fed into and separated in the lower section of absorber 103 and removed via solvent stream 10 that is further fractionated in regenerator 113. Removal of the heavy contaminants in a lower section of the absorber is especially advantageous as subsequent absorption steps in the upper section (typically the second and third absorption steps) operate at lower temperatures that may promote hydrocarbon condensation and foaming of the heavy contaminants (supra). However, in alternative configurations, stream 10 can be separately processed in a regenerator (not shown) operating under vacuum pressure that may be required for fractionation and removal of the very heavy components.

Where the absorber has an upper and a lower section, it is generally preferred that the two sections are separated, most typically by a chimney tray 125. Therefore, flashed gas stream 9 will flow upwards from the lower section of the absorber through chimney tray 125 and enters the upper section of the column. There, the gas is brought into countercurrent contact with a carbon dioxide saturated solvent stream 11 entering near the top of the absorber. The absorber typically comprises conventional trays or packing, which provides approximately 14 to 18 equilibrium stages of gas-liquid contact. Under these conditions, approximately 1000 to 1200 gpm of lean solvent circulation are required to reduce the total sulfur content ($H_2S$, mercaptans and disulfides) of the natural gas to less than 4 ppmv. However, and depending on the particular gas composition and volume, it should be recognized that the type of absorber and the number of equilibrium stages may vary considerably.

It should be especially recognized that the use of a cold carbon dioxide saturated solvent is particularly advantageous as the contacting stages in absorber 103 are almost exclusively utilized for selective absorption of hydrogen sulfide and contaminants since the solvent is already preloaded with carbon dioxide. Since the quantity of hydrogen sulfide, in the feed gas is relatively small compared to carbon dioxide, the absorption of hydrogen sulfide results in a smaller temperature rise in the absorber. With the absorber operating at a lower temperature, the overall solvent circulation and energy consumption can be reduced. With such selective absorption process, acid gas going to the sulfur plant will generally contain less carbon dioxide and is more concentrated in hydrogen sulfide. The terms "carbon dioxide saturated solvent" and "solvent saturated with carbon dioxide" are used interchangeably herein and refer to a solvent that is saturated with at least 50%, more typically at least 80%, and most typically at least 90% carbon dioxide at a particular pressure and temperature as compared to 100% saturation with carbon dioxide at the particular pressure and temperature. Thus, the term "selective absorption of hydrogen sulfide" as used herein refers to a preferred absorption of hydrogen sulfide over absorption of carbon dioxide from a particular gas into a particular solvent.

Another important advantage of such an absorption process is that all contaminants are concentrated in the vapor phase 32 of regenerator overhead 29, resulting in a higher partial pressure of these contaminants, which allows for condensation and hence removal of these contaminants. A still further advantage of such processes is that acid gas from the regenerator will contain less carbon dioxide and less hydrocarbons, which means that a downstream sulfur plant will require less fuel gas and oxygen in the production of a high-quality sulfur. Consequently, the equipment size of such a sulfur plant is smaller and therefore reduces capital and operating cost of the sulfur plant. The term "sulfur plant" as used herein generally refers to all plant configurations in which hydrogen sulfide is converted to elemental sulfur (and other by products), and which will typically emit a tail gas comprising relatively low levels of sulfurous compounds.

The absorber 103 produces an overhead stream 12, which is partially depleted of contaminants (i.e., contains less contaminants than the stream entering the absorber), typically at 20 to 40° F., and a rich solvent stream 13 from chimney tray 125, typically at 40 to 60° F. The overhead stream 12 is mixed with a lean solvent 14 supplied from the solvent chiller 121 at 0 to 40° F., at approximately 1100 to 1300 gpm, forming the vapor-solvent mixture of stream 15.

It should be especially appreciated that this additional step of vapor-solvent contact will saturate the lean solvent stream 14 with carbon dioxide while removing the residual, contaminants and sulfur compounds from the feed gas in overhead stream 12. Stream 15 is further cooled in exchanger 104 using external refrigeration that removes the heat of absorption generated by the absorption of carbon dioxide by the solvent, and the mixture is further chilled to typically 10 to 40° F. forming stream 16. Consequently, it should be recognized that the low temperature of stream 16 will favor the vapor-solvent absorption equilibrium, which in turn will result in a higher loading of acid gas and contaminants in the solvent, thereby reducing the overall solvent circulation and energy consumption.

It should be especially recognized that without this cooling arrangement, the absorber overhead temperature will be higher than that of the lean solvent, as limited by the approach to equilibrium temperature in the absorber. As solvent loading capacity is reduced at the higher temperature, a higher solvent circulation is necessary to meet the same product gas sulfur specification. Higher solvent flow is undesirable, as co-absorption of carbon dioxide will increase, consequently increasing the quantity of acid gases that needs to be processed in the sulfur plant.

The chilled vapor solvent mixture of stream 16 is separated in separator 105 into a contaminant depleted vapor stream 18 (the clean product gas) and a carbon dioxide enriched liquid stream 17. Stream 17 is split into two streams, where about 25% is sent as stream 25 to the third absorption, step in absorber 110, while the remaining 75%, as stream 43, is pumped using solvent pump 106 to the top of absorber 103 as stream 11 to contact the contaminated natural gas rising up the absorber. The refrigerant content of vapor stream 18, typically at 10 to 40° F., is used to cool the feed gas stream 7 in exchanger 102. The treated gas exits the treating unit as stream 46 as the product gas.

The contaminant laden solvent stream 13 is letdown in pressure in JT valve 107 to form stream 19, typically at 100 to 200 psig. Stream 19 is then heated in exchanger 108 by lean solvent stream 28, to typically 240 to 275° F., forming stream 20. Under these high temperature and lower pressure conditions, most of the acid gas, and particularly carbon dioxide is desorbed. Stream 20 is separated in separator 109 into a vapor stream 24 and a flashed liquid stream 21. About 98% or more of the light hydrocarbons; such as methane, about 95% of carbon dioxide, and about 70% of the hydrogen sulfide are desorbed in stream 24. The flashed liquid stream 21 containing the residual gas (mainly hydrogen sulfide and contaminants) is mixed with streams 10 and 50 to form stream 22 prior to being sent to regenerator 113 via JT valve 112 for further fractionation.

The third absorption step is performed in a reboiled absorber 110 that concentrates hydrogen sulfide and contaminants in the rich solvent by rejecting its carbon dioxide content (e.g., by heating the rich solvent). The use of reboiler 111 is optional and is required only to produce an acid gas with a very high hydrogen sulfide concentration. Stream 24 enters near the bottom of reboiled, absorber 110 and lean solvent stream 25, supplied from separator 105 in the second absorption step, enters near the top of the column. When supplementary heating duty is required at reboiler, either hot oil or steam can be used as a heat source to maintain the desired bottom temperature. Typically, the third absorption step is used to reject over 95% of the carbon dioxide content of stream 24. The reboiled absorber 110 is typically designed with 8 to 12 equilibrium stages of vapor solvent contact. Conventional trays or packing can be used as the vapor solvent contact device. The required solvent rate of stream 25 is typically at 25% of the total circulation or as needed to reabsorb substantially all of the hydrogen sulfide and contaminants that are desorbed in stream 24 via heating by exchanger 108. The absorber overhead vapor stream 44, containing mostly carbon dioxide and methane and depleted of hydrogen sulfide and contaminants can be used for carbon dioxide production in stream 44A, and/or recycled back to the interstage of the feed compressor in stream 4. The recycling process maximizes the recovery of methane (typically greater than 98%, and more typically greater than 99.5%) and other valuable gases while eliminating a potential source of emission.

The reboiled absorber overhead vapor 44 is a highly concentrated carbon dioxide stream that is substantially contaminant free (typically less than 0.1 vol %, more typically less than 0.05 vol %), and is suitable for use as a feedstock for chemical production (e.g., for urea fertilizer manufacturing, or soft drink industries). The residual contaminants level in this stream is very low and therefore, further purification to meet the product carbon dioxide specification requires minimal capital and operating costs. Alternatively, the highly concentrated carbon dioxide stream may be, employed in enhanced oil recovery in the associated oil field production. It should still further be recognized that removal of the carbon dioxide rich stream 44A also reduces the recycle flow of stream 4 and further improves the heating value of the product gas (particularly when the product gas is required to meet the heating value or Wobbe Index specification of a sales gas).

The reboiled absorber bottom stream 23, containing about 5% of the residual carbon dioxide is split into stream 45 and stream 50. Stream 45 is used as hydrogen sulfide-rich lean solvent (after reduction in pressure via JT valve 128) for absorption of hydrocarbons in the fourth absorption step in absorber 118. Stream 50 is combined with stream 21 from separator 109 and stream 10 from the first absorption step, forming stream 22. Stream 22 is letdown in pressure via valve 112 to about 25 psig forming stream 26 and enters the top section of regenerator 113. Regenerator 113 is preferably a fractionation column, typically designed with 12 to 16 equilibrium stages of vapor solvent contact. Conventional trays or packing can be used as the vapor solvent contact device. The regenerator bottoms temperature is typically maintained at 285 to 300° F. with application of heat with either a hot oil or steam as a heat source. The reboiler duty is about 30 to 40 MMBtu/h, or as required to produce a lean solvent with very low sulfur and mercaptans content (less than 5 ppm) necessary for meeting the 4 ppmv total sulfur specification for sales gas.

The regenerator produces a lean solvent stream 28 and all overhead gas stream 29. The heat content of lean solvent is recovered by preheating (partially regenerating) the rich solvent in exchanger 108. In exchanger 108, stream 28 is cooled to form stream 40 at typically 100 to 120° F. The cooled solvent is further pumped to absorber pressure with pump 120. The pump discharge stream 41 is split into stream 6 and stream 42. Stream 6 is injected to the feed gas stream for heavy hydrocarbon and contaminant removal in the first absorption step. Stream 42 is cooled with refrigeration in exchanger 121 to typically 0 to 40° F., and is mixed with overhead vapor 12 from absorber 103 in the second absorption step.

It should be especially appreciated that the presence of a large amount of water (steam) at the bottom of the regenerator will enhance stripping and removal of the heavy components.

Therefore, a person of ordinary skill in the art will adjust the water content in the solvent (e.g., dimethyl ethers of polyethylene glycols) to promote and/or optimize stripping and desorption of the contaminants from the solvent. In addition to removal of contaminants in the regenerator, the leaner solvent is very effective in contaminant absorption in the second absorption step to help meet the stringent product gas specification.

The regenerator overhead gas stream 29 is cooled with a cooling medium (e.g., cooling water followed by a refrigerant) in exchanger 115 to typically 40 to 50° F., forming stream 30 that is further separated in a three phase separator 116 into a liquid stream 31, a vapor stream 32, a water stream 34 and a hydrocarbon stream 35. Liquid stream 31, typically comprising water saturated with solvent, hydrocarbons and contaminant is pumped by reflux pump 117 to the regenerator as stream 27. A portion of the water is delivered to the regenerator to maintain the water content of the solvent at a predetermined level. As those skilled in the art will readily recognize, various feed gas streams occasionally include undesirable amounts of water. Accordingly, to maintain the water content of the solvent at a predetermined concentration, any additional water absorbed by the solvent from the feed gas can be removed in regenerator 113 as stream 34.

The contaminants in stream 32 decrease with decreasing temperature, and the lower limit is governed by the water freeze out temperature of 32° F. The residual contaminant level, and in particular the lighter contaminants such as methyl mercaptans, benzene, toluene and xylene may still be present in significant quantity (even at about 40° F., the contaminants level can be as high as 1 to 2%). The presence of such high levels of contaminants will have negative impacts in the sulfur operation plant, and particularly includes high energy consumption and short catalyst life, and off specification sulfur product.

To circumvent such problems, a fourth absorption step using absorber 118 is used to further treat the acid gas stream 32. Lean solvent stream 46A employed in this step originates from the bottom of absorber 110 in the third absorption step via stream 45. This solvent stream is particularly advantageous in the absorption of residual contaminants since it is saturated with hydrogen sulfide. Use of solvent 46A will reject most of the hydrogen sulfide from the solvent to the overhead stream 47 while absorbing most of the hydrocarbons and contaminants from the acid gas in stream 32. This fourth absorption step further improves the hydrogen sulfide concentration to the sulfur plant by as high as 10%. The concentration of hydrogen sulfide in stream 47 to the sulfur plant can be as high as 70%. The bottom stream 33 from absorber 118 is pumped by pump 119 as stream 36 to the upper section of the regenerator 113, which separates the contaminants and hydrocarbon liquid in the overhead drum 116 producing the raw hydrocarbon liquid stream 35.

Thus, in contemplated configurations it is expected that over 99% of the contaminants (heavy hydrocarbons and mercaptans) are removed in stream 35. Since this stream is saturated with light hydrocarbons and light mercaptans, further stripping is typically required before it can be sold as a hydrocarbon product. Therefore a stripper 126 with heat supplied by reboiler 127 is used to strip these light components from stream 35. Preferred strippers contain contacting trays that are used to fractionate the lighter components from the heavy liquid producing a liquid product 49. The overhead vapor stream 48 containing the light mercaptans and $H_2S$ is sent to sulfur plant for conversion as a sulfur product.

Water stream 34, containing minimal residual contaminants, is purged from separator 116 to the sour water stripper unit in order to maintain, a water balance. Vapor streams 47 and 48 from absorber 118 and stripper 126, respectively, typically comprising 50 to 70% hydrogen sulfide, 30 to 50% carbon dioxide (and very low level residual hydrocarbon content) can be fed directly to a sulfur plant 122. Such gas composition is expected to allow the sulfur plant to operate in a stable and efficient mode, with minimum oxygen and fuel consumption, while converting virtually all the residual hydrocarbons and mercaptans and disulfides into inert products. The sulfur plane produces a sulfur product stream 37 and a tail gas stream 38. The tail gas stream 38, predominantly comprising carbon dioxide and small quantity of sulfur oxides, is sent to a hydrogenation and quench unit 123. The gas is hydrogenated over a catalyst bed that converts all sulfur oxides back to hydrogen sulfide. The converted gas is quenched with water, cooled and exits the quench gas unit as stream 39.

It should be especially appreciated that conventional processes normally require a tail gas unit that includes another treatment unit and an incineration unit. Besides added capital and operating costs, conventional processes also generate a source of gaseous emission. As tighter controls on overall sulfur emissions are imposed by regulations, emissions from a tail gas unit will no longer meet the regulation requirements. In contrast, contemplated configurations eliminate such emissions entirely. Furthermore, a small blower 124 can be used (optionally depending on the feed pressure) to recycle the tail gas back to the plant inlet.

Consequently, it should be recognized that contemplated configurations allow for economically treating a highly contaminated feed gas to meet pipeline specification, improved contaminant removal, reduced recycle flow rates, heating and cooling duties, and significantly reduced capital and operating costs associated with the use of such a process. Particularly, carbon dioxide content in the product gas can be tailored to meet the sales gas specification by diverting the carbon dioxide rich recycle stream to outside the unit for industrial usages.

Furthermore, it should be recognized that in contemplated configurations and methods a low quality gas is treated in four absorption steps for removal of contaminants, including heavy hydrocarbons, mercaptans, disulfides and aromatics; and that a cooler/stripper step process is employed in the solvent regenerator to remove the contaminants in a liquid, which is stripped to produce a stabilized marketable liquid product.

It should also be especially noted that in contemplated configurations the hydrogen sulfide is concentrated in the fourth absorption step to produce an acid gas with a hydrogen sulfide content of greater that 60%. Such concentrated hydrogen sulfide streams may advantageously be converted to an inert form of sulfur. It should be particularly appreciated that the contaminant depleted acid gas stream is a highly desirable feed gas to a sulfur plant as the contaminant depleted acid gas stream will avoid poisoning and deactivation of the catalyst in a Claus reactor in the sulfur plant and thus ensure an on-specification sulfur product.

While contemplated configurations and processes are particularly useful for selectively removing gas contaminants such as hydrogen sulfide, mercaptans, disulfides, aromatics and heavy hydrocarbons from natural gas, synthesis gas, landfill waste gas, or refinery off-gases, it should be recognizes that alternative contaminants, including various sulfur compounds, carbonyl sulfide, cyanides, and other gas contaminants may also be removed from a variety of feed gases. Still further, and particularly when the feed gas contains a significant carbon dioxide content, contemplated configurations and processes can also be used to efficiently extract carbon dioxide to meet sales gas specification on the heating value and Wobbe Index. The extracted carbon dioxide, which is highly concentrated and contaminant free, may be further purified and used for chemical production or enhanced oil recovery.

Additional advantages of contemplated configurations and methods include recycling of the tail gas from a sulfur plant after hydrogenation and quenching. The so converted tail gas (mostly hydrogen sulfide and carbon-dioxide) is recycled back to the suction of the feed gas compressor. Furthermore, off-gas from the third absorption step is also recycled back to the interstage of the feed gas compressor. Thus, in such recycling to extinction configurations all or almost all emission sources generated in the process are eliminated.

Contemplated configurations and processes can be advantageously used to process and treat a contaminant waste gas stream while upgrading the low quality gas to a high quality dehydrated gas for a consumer pipeline. At the same time, contemplated configurations and processes will recover the energy value of the hydrocarbon contents as a sellable hydrocarbon liquid and a sulfur product. Therefore, such configurations and processes recycle all or almost all of the waste gas streams and will generally not produce gaseous emissions that are normally encountered in currently known processing facilities.

Therefore, the inventors contemplate a gas treatment plant with a first absorber in which a lean solvent absorbs carbon-dioxide, hydrogen sulfide, and a hydrocarbon. A second absorber fluidly coupled to the first absorber, wherein at least part of the hydrogen sulfide is separated from the carbon dioxide, and sulfur plant receives the hydrogen sulfide to produce a sulfur product and a tail gas, wherein at least part of the tail gas is hydrogenated and is recycled to the absorber. Such plants may advantageously include a regenerator that is fluidly coupled to the first and second absorber, wherein the regenerator produces an acid gas, and wherein at least part of the hydrocarbon is separated from the acid gas as a hydrocarbon liquid. A stripper may be included that receives at least part of the hydrocarbon liquid and in which residual sulfurous compounds are at least partially stripped from the hydrocarbon liquid (and are preferably fed to the sulfur plant). In particularly preferred configurations, the second absorber is operated at a lower pressure and at a higher temperature than the first absorber such that the carbon dioxide is desorbed form the rich solvent and is recycled back to the first absorber. The so produced carbon dioxide may then be used for enhanced oil recovery or used as commercial product (after optional further purification).

Viewed from another perspective, contemplated plants may include an absorber that receives (a) a feed gas comprising carbon dioxide and hydrogen sulfide and (b) a carbon dioxide saturated lean solvent, and that produces an overhead vapor comprising at least a portion of the carbon dioxide, wherein a lean solvent is combined with the overhead vapor and then cooled, to form a cooled carbon dioxide saturated lean solvent, thereby reducing the temperature rise in the absorber and hence increasing selective absorption of the hydrogen sulfide from the feed gas in the lean solvent. Such absorbers will preferably produce a bottom product that is reduced in pressure and heated to a (higher) temperature sufficient to desorb the carbon dioxide content from the bottom product, and it is further preferred that the hydrogen sulfide content in the separated carbon dioxide is further re-absorbed in a second absorber using a portion of the carbon dioxide saturated lean solvent.

Furthermore, the inventors contemplate that a gas treatment plant according to the inventive subject matter may include a solvent regenerator that receives from a plurality of absorbers a solvent comprising an acid gas and a hydrocarbon, and that produces an overhead vapor that is further cooled and separated forming an acid gas, water and hydrocarbon liquid. The hydrocarbon liquid is optionally fed to a stripper that fractionates the hydrocarbon liquid to produce a hydrogen sulfide depleted hydrocarbon product and a vapor comprising hydrogen sulfide that is fed to a sulfur plant. In such configurations, it is generally preferred that the acid gas is fed to an absorber in which a carbon dioxide depleted hydrogen sulfide rich solvent scrubs the acid gas, wherein the scrubbed acid gas is fed to the sulfur plant (which may produce a tail gas, wherein at least part of the tail gas is hydrogenated and recycled to at least one of the plurality of the absorbers).

Viewed from yet another perspective, contemplated plants may include an absorber that receives from a solvent regenerator a vapor comprising hydrogen sulfide and a hydrocarbon, wherein the absorber further receives a carbon dioxide-depleted solvent comprising hydrogen sulfide, and wherein the absorber produces a hydrocarbon-depleted overhead vapor comprising hydrogen sulfide that is fed to a sulfur plant, and a hydrocarbon-enriched bottom product that is recycled to the solvent regenerator. It is generally preferred that in such configurations the carbon dioxide-depleted solvent is produced by another absorber that separates hydrogen sulfide from carbon dioxide using a carbon dioxide saturated lean solvent, and that a portion of the carbon dioxide-depleted solvent is fed to the solvent regenerator.

Consequently, the inventors contemplate a method of treating a gas in which in one step the gas is optionally contacted with a first portion of a lean solvent to absorb at least one of a heavy hydrocarbon and a heavy mercaptan from the gas into the first portion of the lean solvent. In another step, the gas is cooled and the cooled gas is contacted in an absorber with a second portion of the lean solvent to absorb at least one of a light hydrocarbon, a light mercaptan, and $H_2S$ into the second portion of the lean solvent, wherein the second portion of the lean solvent is saturated with carbon dioxide. In yet another step, the gas exiting the absorber is further contacted with a third portion of the lean solvent to saturate the third portion with carbon dioxide thereby forming a gas solvent mix, and the gas solvent mix is then cooled and separated thereby forming, the second portion of the lean solvent that is saturated with carbon dioxide.

Thus, specific embodiments and applications of near-zero emission gas treating processes have been disclosed. It should be apparent, however, to those skilled in the art that many more modifications besides those already described are possible without departing from the inventive concepts herein. The inventive subject matter, therefore, is not to be restricted except in the spirit of the disclosure. Moreover, in interpreting both the specification, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

The invention claimed is:

1. A gas treatment plant comprising:
   a first absorber in which a lean solvent absorbs carbon dioxide, hydrogen sulfide, and a hydrocarbon;
   a second absorber fluidly coupled to the first absorber in which at least part of the hydrogen sulfide is separated from the carbon dioxide;
   a sulfur plant that receives the at least part of the hydrogen sulfide to produce a sulfur product and a tail gas, wherein at least part of the tail gas is hydrogenated and is recycled to the absorber; and a regenerator that is fluidly coupled to the first and second absorber, wherein the regenerator produces an acid gas, and wherein at least part of the hydrocarbon is separated from the acid gas as a hydrocarbon liquid.

2. The gas treatment plant of claim 1 further comprising a third absorber that receives at least part of the hydrocarbon liquid and in which residual sulfurous compounds are at least partially removed from the hydrocarbon liquid.

3. The gas treatment plant of claim 2 wherein the residual sulfurous compounds are fed to a sulfur plant.

4. The gas treatment plant of claim 1 wherein the second absorber is operated at a lower pressure and at a higher temperature than the first absorber such that that the carbon dioxide desorbed from the solvent in the second absorber has a purity of at least 90 mol %.

5. The gas treatment plant of claim 4 wherein the carbon dioxide is used for enhanced oil recovery or used as commercial product.

6. A gas treatment plant comprising:
an absorber that is configured to receive (a) a feed gas comprising carbon dioxide and hydrogen sulfide, (b) a carbon dioxide saturated lean solvent, and (c) wherein the absorber is further configured to produce an overhead vapor comprising at least a portion of the carbon dioxide;
a conduit fluidly coupled to the absorber and configured to allow combination of a lean solvent with the overhead vapor to so allow formation of the carbon dioxide saturated lean solvent, and a cooler configured to allow cooling of the carbon dioxide saturated lean solvent to thereby allow for increased selective absorption of the hydrogen sulfide from the feed gas in the lean solvent.

7. The gas treatment plant of claim 6 wherein the absorber produces a bottom product that is reduced in pressure and heated to a temperature sufficient to desorb the carbon dioxide from the bottom product.

8. The gas treatment plant of claim 7 wherein at least a portion of the hydrogen sulfide in the desorbed carbon dioxide is absorbed in a second absorber using a portion of the carbon dioxide saturated lean solvent.

9. A gas treatment plant comprising:
a solvent regenerator that receives from a plurality of absorbers a solvent comprising an acid gas and a hydrocarbon, and that produces an overhead vapor;
a separator that receives the overhead vapor and separates the acid gas from the hydrocarbon to form a hydrocarbon liquid; and
a stripper that is fluidly coupled to the separator and fractionates the hydrocarbon liquid to produce a hydrogen sulfide depleted hydrocarbon product and a vapor comprising hydrogen sulfide that is fed to a sulfur plant.

10. The gas treatment plant of claim 9 wherein the acid gas is fed to an absorber in which a carbon dioxide depleted hydrogen sulfide rich solvent scrubs the acid gas.

11. The gas treatment plant of claim 10 wherein the scrubbed acid gas is fed to the sulfur plant.

12. The gas treatment plant of claim 11 wherein the sulfur plant produces a tail gas, and wherein at least part of the tail gas is hydrogenated and is recycled to at least one of the plurality of the absorbers.

13. A gas treatment plant comprising:
an absorber that receives from a solvent regenerator a vapor that comprises hydrogen sulfide and a hydrocarbon, and that further receives a carbon dioxide-depleted solvent comprising hydrogen sulfide; and
wherein the absorber produces a hydrocarbon-depleted overhead vapor comprising hydrogen sulfide that is fed to a sulfur plant, and a hydrocarbon-enriched bottom product that is recycled to the solvent regenerator.

14. The gas treatment plant of claim 13 wherein the carbon dioxide-depleted solvent is produced by another absorber that separates hydrogen sulfide from carbon dioxide using a carbon dioxide saturated lean solvent.

15. The gas treatment plant of claim 13 wherein a portion of the carbon dioxide-depleted solvent is fed to the solvent regenerator.

16. A method of treating a gas comprising:
optionally contacting a gas with a first portion of a lean solvent to absorb at least one of a heavy hydrocarbon and a heavy mercaptan from the gas into the first portion of the lean solvent;
cooling the gas and contacting the cooled gas in an absorber with a second portion of the lean solvent to absorb at least one of a light hydrocarbon, a light mercaptan, and H2S into the second portion of the lean solvent, wherein the second portion of the lean solvent is saturated with carbon dioxide;
contacting the gas exiting the absorber with a third portion of the lean solvent to saturate the third portion with carbon dioxide thereby forming a gas solvent mix; and
cooling and separating the gas solvent mix, thereby forming the second portion of the lean solvent that is saturated with carbon dioxide.

17. The method of claim 16 wherein the step of optionally contacting is performed before the gas enters the absorber, and wherein the contacted gas is cooled before the contacted gas enters the absorber.

18. The method of claim 16 wherein part of the second portion of the lean solvent that is saturated with carbon dioxide is employed in another absorber as an absorbing solvent that removes hydrogen sulfide from a vapor.

19. The method of claim 18 wherein the another absorber is operated under conditions to reject carbon dioxide from the part of the second portion of the lean solvent.

* * * * *